United States Patent
Hong

(10) Patent No.: US 9,348,474 B2
(45) Date of Patent: May 24, 2016

(54) DISPLAY DEVICE INTEGRATED WITH TOUCH SCREEN PANEL

(71) Applicant: Samsung Display Co., Ltd., Yongin, Gyeonggi-Do (KR)

(72) Inventor: Sang-Min Hong, Yongin (KR)

(73) Assignee: Samsung Display Co., Ltd., Yongin (KR)

(*) Notice: Subject to any disclaimer, the term of this patent is extended or adjusted under 35 U.S.C. 154(b) by 64 days.

(21) Appl. No.: 14/221,856

(22) Filed: Mar. 21, 2014

(65) Prior Publication Data

US 2015/0077384 A1 Mar. 19, 2015

(30) Foreign Application Priority Data

Sep. 17, 2013 (KR) .................. 10-2013-0111591

(51) Int. Cl.
*G06F 3/041* (2006.01)
*G06F 3/044* (2006.01)

(52) U.S. Cl.
CPC ...... *G06F 3/044* (2013.01); *G06F 2203/04111* (2013.01)

(58) Field of Classification Search
CPC ............ G06F 3/0412; G06F 3/044; G06F 2203/04103; G06F 2203/04111
USPC ........................................................ 345/174
See application file for complete search history.

(56) References Cited

U.S. PATENT DOCUMENTS

| 2005/0070035 | A1 | 3/2005 | Yazaki et al. |
| 2006/0043510 | A1 | 3/2006 | Yamazaki et al. |
| 2007/0176563 | A1 | 8/2007 | Kim et al. |
| 2011/0074729 | A1* | 3/2011 | Im et al. ........................ 345/174 |
| 2012/0062486 | A1* | 3/2012 | Rho ............................ 345/173 |
| 2014/0198267 | A1 | 7/2014 | Jeong et al. |

FOREIGN PATENT DOCUMENTS

| KR | 10-2005-0030532 A | 3/2005 |
| KR | 10-2006-0048932 A | 5/2006 |
| KR | 10-0671643 B | 1/2007 |
| KR | 10-2014-0093092 A | 7/2014 |

* cited by examiner

*Primary Examiner* — Gustavo Polo
(74) *Attorney, Agent, or Firm* — Knobbe Martens Olson & Bear LLP

(57) ABSTRACT

A display device integrated with a touch screen panel includes upper and lower substrates; the upper substrate comprising a major surface; a display area and a non-display area next to the display area when viewed in a viewing direction perpendicular to the major surface; and a sealing material formed between the upper and lower substrates and in the non-display area when viewed in the viewing direction. The display further includes a sensing cell structure formed over the upper substrate and in the display area; conductive lines formed over the upper substrate and in the non-display area, and connected to the sensing cell structure. The conductive lines overlap with the sealing material; and an optical layer is formed between two immediately neighboring conductive lines among the conductive lines.

18 Claims, 3 Drawing Sheets

DISPLAY DEVICE INTEGRATED WITH TOUCH SCREEN PANEL

RELATED APPLICATIONS

This application claims priority to and the benefit of Korean Patent Application No. 10-2013-0111591, filed on Sep. 17, 2013, in the Korean Intellectual Property Office, the entire contents of which are incorporated herein by reference in their entirety.

BACKGROUND

1. Field

An aspect of the present invention relates to a display device integrated with a touch screen panel.

2. Description of the Related Art

A touch screen panel is an input device that allows a user's instruction to be input by selecting an instruction content or icon displayed on a screen of a display device or the like with a user's hand or an object.

To this end, the touch screen panel is formed on a front face of the display device to convert a contact position into an electrical signal. Here, the user's hand or an object is directly in contact with the touch screen panel at the contact position. Accordingly, the instruction content selected at the contact position is input as an input signal to the image display device.

Since such a touch screen panel can substitute for a separate input device, such as a keyboard or mouse, its application fields have been gradually extended.

Touch screen panels are divided into a resistive overlay touch screen panel, a photosensitive touch screen panel, an electrostatic capacitive touch screen panel, and the like. Among these touch screen panels, the capacitive touch screen panel converts a contact position into an electrical signal by sensing a change in capacitance formed between a conductive sensing electrode and an adjacent sensing electrode or ground electrode when a user's hand or an object comes in contact with the touch screen panel.

SUMMARY

Embodiments provide a display device integrated with a touch screen panel directly formed on the upper substrate of the display device, in which conductive lines arranged in a non-display area of the touch screen panel are overlapped with a sealing material for bonding upper and lower substrates of the display device, and an optical layer is formed in the area between the conductive lines.

An aspect of the invention provides a display device integrated with a touch screen panel, which may comprise: upper and lower substrates, the upper substrate comprising a major surface; a display area and a non-display area next to the display area when viewed in a viewing direction perpendicular to the major surface; a sensing cell structure comprising a plurality of sensing cells and formed over the upper substrate and in the display area when viewed in the viewing direction; a plurality of conductive lines formed over the upper substrate and in the non-display area when viewed in the viewing direction, the plurality of conductive lines being connected to the sensing cell structure; a sealing material formed between the upper and lower substrates and in the non-display area when viewed in the viewing direction; the plurality of conductive lines overlapping with the sealing material when viewed in the viewing direction; and an optical layer formed between two immediately neighboring conductive lines among the plurality of conductive lines when viewed in the viewing direction.

In the foregoing device, the optical layer may be formed of a material having a refractive index of about 2 or more while allowing light to be transmitted therethrough. In the foregoing devices, the optical layer may be formed of indium tin oxide (ITO).

In the foregoing devices, the upper substrate may comprise a recessed area formed on a surface thereof and positioned between the two immediately neighboring conductive lines when viewed in the viewing direction, wherein the optical layer may be formed in the recessed area. In the foregoing devices, the recessed area of the upper substrate may have a section formed in the shape of an inverse triangle.

In the foregoing devices, the display device may further comprise an insulation layer formed over the upper substrate and the conductive lines, wherein the insulation layer may comprise a recessed area formed on a surface thereof and positioned between the two immediately neighboring conductive lines when viewed in the viewing direction, wherein the optical layer may be formed in the recessed area. In the foregoing devices, the recessed area of the upper substrate may have a section formed in the shape of an inverse triangle.

In the foregoing devices, the device may further comprise a driving circuit area formed in the non-display area when viewed in the viewing direction.

In the foregoing devices, the sensing cell structure may comprise: the plurality of sensing cells comprising first sensing cells arranged along row lines extending along a first direction, and second sensing cells arranged along column lines extending along a second direction; first connecting lines, each of which is formed to connect two cells among the first sensing cells arranged along the first direction; and second connecting lines, each of which is formed to connect two cells among the second sensing cells arranged along the second direction.

In the foregoing devices, the plurality of sensing cells may be formed in the same layer. The second sensing cells may be integrally formed with the second connecting lines.

In the foregoing devices, the display device may further comprise an insulation layer interposed between one of the first connecting lines and one of the second connecting lines which overlap each other when viewed in the viewing direction.

In the foregoing devices, the plurality of sensing cells may be formed on an outer surface of the upper substrate. In the foregoing devices, the upper substrate may be a sealing substrate of an organic light emitting display device.

In the foregoing devices, the display device may further comprise: a polarizing film placed over the upper substrate over which the sensing cell structure and the conductive lines are formed; and a window substrate placed over the polarizing film. In the foregoing devices, the device may further comprise a black matrix layer formed over the window substrate and in the non-display area when viewed in the viewing direction.

In the foregoing devices, the polarizing film may be flexible and comprise a polarizer, a retardation compensation layer, and a transparent adhesive for supporting the polarizer and attaching the retardation compensation layer to the polarizer. In the foregoing devices, the window substrate may be flexible and formed of at least one selected from the group consisting of polymethyl methacrylate (PMMA), acryl and polyester.

BRIEF DESCRIPTION OF THE DRAWINGS

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the example embodiments to those skilled in the art.

Figure 1:
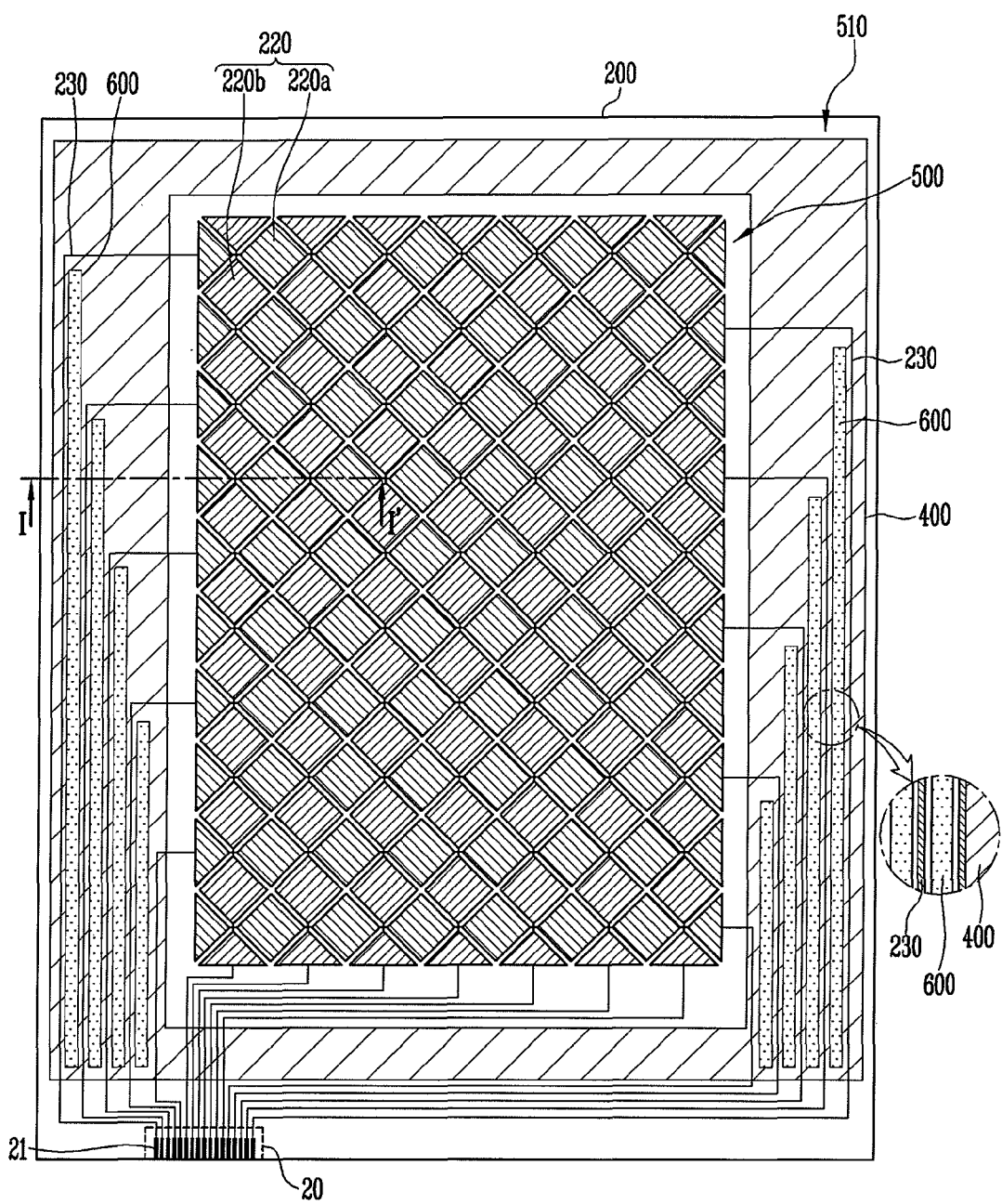

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a plan view showing an upper substrate of a display device integrated with a touch screen panel according to an embodiment of the present invention.

Figure 2:
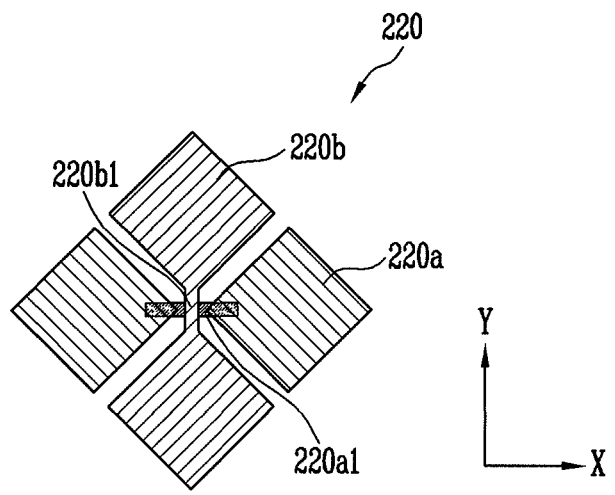

FIG. 2 is a main portion enlarged view showing an example of a sensing cell pattern shown in FIG. 1.

Figure 3:
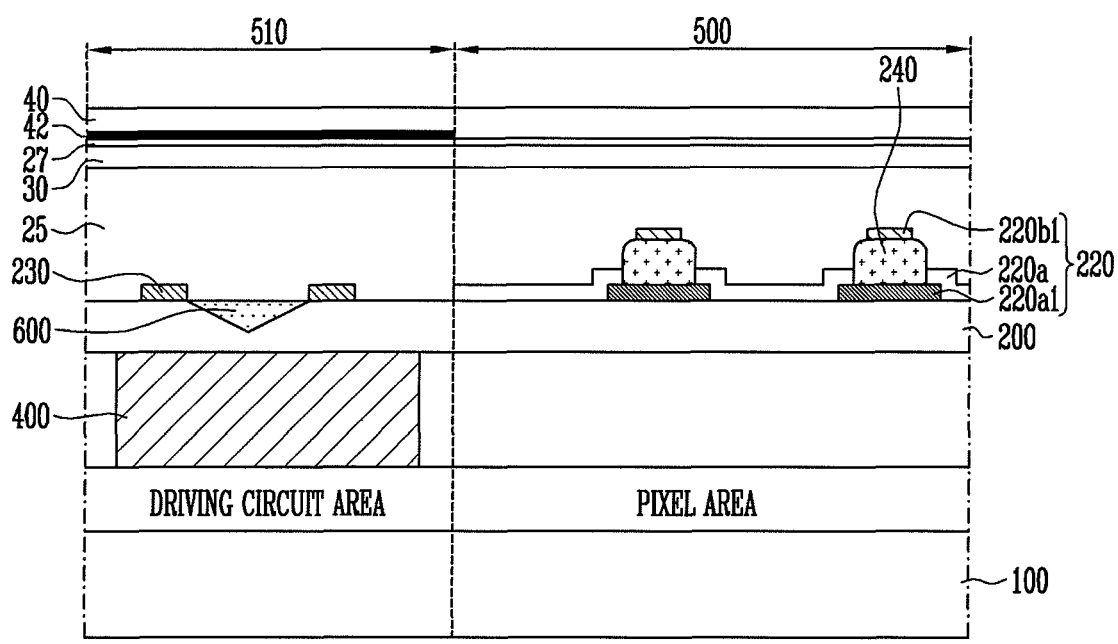

FIG. 3 is a sectional view showing one area (I-I') of the display device integrated with the touch screen panel according to an embodiment of the present invention.

Figure 4:
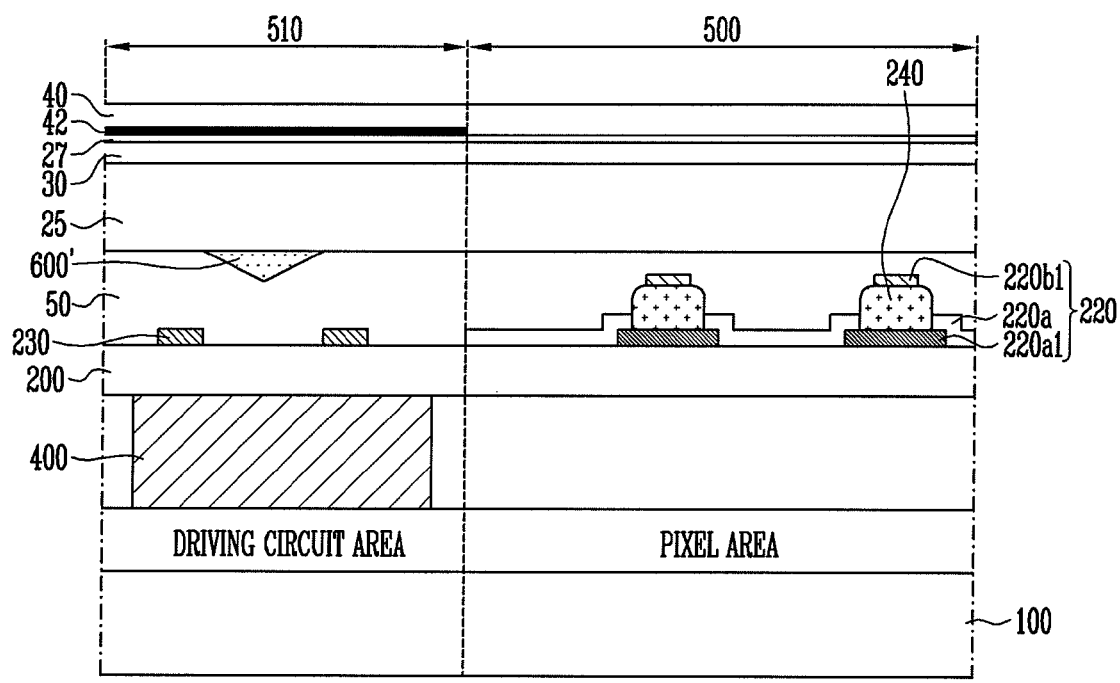

FIG. 4 is a sectional view showing one area (I-I') of a display device integrated with a touch screen panel according to another embodiment of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

FIG. 1 is a plan view showing an upper substrate of a display device integrated with a touch screen panel according to an embodiment of the present invention. FIG. 2 is a main portion enlarged view showing an example of a sensing cell pattern or sensing cell structure shown in FIG. 1.

This embodiment provides a display device integrated with a touch screen panel, in which the touch screen panel is directly formed on or formed over an outer surface of an upper substrate 200 of the display device facing away from a lower substrate 100.

FIG. 1 is a plan view showing the outer surface of the display device according to this embodiment.

However, this is an embodiment of the display device, and the invention is not limited thereto. That is, the touch screen panel may be formed on an inner surface of the upper substrate 200 facing the lower surface 100. Alternatively, first sensing cells 220a of a sensing cell pattern or sensing cell structure 220 of the touch screen panel may be formed on the inner surface of the upper substrate, and second sensing cells 220b alternately disposed not to overlap with the first sensing cells 220a when viewed in a viewing direction perpendicular to the outer or inner surface may be formed on an outer surface of the upper substrate 200.

The display device may be an organic light emitting display device or liquid crystal display device. In this embodiment, the organic light emitting display device will be described as an example.

Accordingly, the upper substrate 200 is a sealing substrate of the organic light emitting display device. The upper substrate 200 is preferably implemented with a transparent material.

However, in a case where the organic light emitting display device has flexibility, the upper substrate 200 may also be implemented with a film material (e.g., a polyimide material) having flexibility, or may be implemented with a plurality of thin film layers.

The touch screen panel according to this embodiment, as shown in FIG. 1, includes a sensing cell pattern or sensing cell structure 220 formed on the outer surface of the upper substrate 200, i.e., the transparent substrate performing the function of a sealing substrate, and conductive lines or patterned wires 230 for connecting the sensing cell pattern 220 to an external driving circuit (not shown) through a bonding pad portion 20.

In this case, the area in which the plurality of sensing cell pattern 220 are formed is a display area 500 in which an image is displayed to detect a touch position, and the area in which the conductive lines 230 electrically connected to the sensing cell pattern 220 and the bonding pad portion 20 are formed is a non-display area 510 provided at the outside of the display area 500. In embodiments, the non-display area is located next to the display area when viewed in the viewing direction with or without a gap. In one embodiment, the non-display area surrounds the display area when viewed in the viewing direction.

In embodiments, a sealing material 400 is coated in the non-display area 510 and between the upper substrate 200 and a lower substrate 100 so that the upper substrate 200 and the lower substrate 100 of the organic light emitting display device are bonded together.

That is, the sealing material 400 is coated in the non-display area 510 on the inner surface of the upper substrate 200, and laser is irradiated onto the non-display area 510 at the outside of the upper substrate 200 so that the sealing material 400 is cured. Accordingly, the upper substrate 200 and the lower substrate are bonded together. In other embodiments, UV light can be used instead of the laser, but the invention is not limited thereto.

Although the width of the non-display area 510 and the sealing material 400 in the touch screen panel is exaggerated in FIG. 1, this is provided for convenience of illustration, and the actual width is considerably narrower than the width shown in FIG. 1.

In embodiments, to maximally expand the display area 500 in which image display and touch recognition are performed, the width of the non-display area 510 positioned at the outside of the display area 500 is considerably narrowed.

In a case where the conductive lines 230 are formed in a non-display area which is not overlapped with the sealing material, the width of the conductive lines 230 and the interval between the conductive lines 230 are also narrowed as the width of the non-display area 510 is reduced. However, this may cause increased resistance of the conductive lines, and short circuit between the conductive lines.

If the width of the conductive lines 230 and the interval between the conductive lines 230 are maintained as they are, the conductive lines 230 are overlapped with the sealing material 400 when viewed in the viewing direction. In this case, it may be possible that the sealing material 400 is not sufficiently cured at an area overlapping the conductive lines in a subsequent curing process of the sealing material 400, using laser. Therefore, a bonding failure may occur.

In this embodiment, the conductive lines 230 arranged in the non-display area of the touch screen panel are overlapped with the sealing material 400 for sealing the upper substrate 200 and the lower substrate, and an optical layer 600 is formed in an area between the conductive lines 230 when viewed in the viewing direction, so that it is possible to minimize the lowering of the exfoliation force between the substrates, caused by non-curing or insufficient curing of the sealing material 400, and concurrently to avoid, reduce or minimize possibility of resistance increase of the conductive lines and a short circuit between the conductive lines due to the reduction of a dead space.

The structure of the touch screen panel according to this embodiment will be described in detail with reference to FIGS. 1 and 2.

The sensing cell pattern 220, as shown in FIG. 2, includes first sensing cells 220*a* formed to be arranged along row lines extending along a first direction (X-axis direction), and second sensing cells 220*b* formed to be arranged along column lines extending along a second direction (Y-axis direction). The sensing cell pattern 220 further includes first connecting lines 220*a*1 and second connecting lines 220*b*1. Each of the first connecting lines 220*a*1 is formed to connect two immediately neighboring cells among the first sensing cells 220*a* along the first direction, and each of the second connecting lines 220*b*1 is formed to connect two immediately neighboring cells among the second sensing cells 220*b* along the second direction.

The first sensing cells 220*a* and the second sensing cells 220*b* are alternately arranged not to overlap with each other when viewed in the viewing direction, and the first and second connecting lines 220*a*1 and 220*b*1 intersect each other when viewed in the viewing direction. In this case, an insulating layer (not shown) for ensuring stability is interposed between the first and second connecting lines 220*a*1 and 220*b*1 overlapping each other.

Meanwhile, the first sensing cells 220*a* may be integrally and simultaneously formed with the first connecting lines 220*a*1 using a transparent conductive material such as indium tin oxide (hereinafter, referred to as ITO). In other embodiments, the first sensing cells 220*a* may be formed prior to or after the formation of the first connecting lines 220*a*1. The second sensing cells 220*b* may be integrally and simultaneously formed with the second connecting lines 220*b*1 using a transparent conductive material such as ITO. In other embodiments, the second sensing cells 220*b* may be formed prior to or after the formation of the second connecting lines 220*b*1.

For example, the second sensing cells 220*b* are integrally formed with the second connecting lines 220*b*1 by being patterned in the second direction. The first sensing cells 220*a* are patterned to respectively have an independent pattern between the second sensing cells 220*b*, and may be connected along the first direction by the first connecting lines 220*a*1 positioned above or below of the first sensing cells 220*a*.

In this case, the first connecting lines 220*a*1 may be electrically connected to the first sensing cells 220*a* by coming in direct contact with the first sensing cells 220*a* above or below the first sensing cells 220*a*. Alternatively, the first connecting lines 220*a*1 may be electrically connected to the first sensing cells 220*a* through contact holes, etc.

The first connecting lines 220*a*1 may be formed using a transparent conductive material such as ITO or using an opaque low-resistance metal material. In this case, the width of the first connecting lines 220*a*1 may be adjusted so that the visualization of the sensing pattern is prevented, reduced or minimized.

The conductive lines 230 are respectively connected electrically to row lines of the first sensing cells 220*a* and column lines of the second sensing cells 220*b*, so as to connect the row and column lines of the first and second sensing cells 220*a* and 220*b* to the external driving circuit (not shown) such as a position detecting circuit through the bonding pad portion 20.

The touch screen panel configured as described above is an electrostatic capacitive touch screen panel. If a contact object such as a user's finger or stylus pen comes in contact with the touch screen panel, a change in capacitance, caused by a contact position, is transferred from the sensing pattern 220 to the driving circuit (not shown) via the conductive lines or sensing lines 230 and the bonding pad portion 20. Then, the change in capacitance is converted into an electrical signal by X and Y input processing circuits (not shown), thereby detecting the contact position.

The conductive lines 230 according to this embodiment may be formed of a low-resistance metallic material such as molybdenum (Mo), silver (Ag), titanium (Ti), copper (Cu), aluminum (Al) or Mo/Al/Mo. The conductive lines 230 are arranged in the non-display area 510, and there exists a portion overlapped with the sealing material 400 as shown in FIG. 1.

In case where the conductive lines 230 are formed of an opaque low-resistance metallic material, laser cannot be transmitted through the conductive lines 230 formed in the area overlapped with the sealing material 400, and therefore, it is possible that the sealing material 400 is not sufficiently cured in the overlapping area.

Accordingly, in this embodiment, optical layers 600, each is formed between two immediately neighboring lines among the conductive lines 230 which overlap the sealing material 400 when viewed in the viewing direction.

The optical layer 600 allows light to be also irradiated onto the area of the sealing material overlapped with the conductive lines 230, using optical characteristics of light, i.e., diffraction and refraction characteristics of light. Accordingly, it is possible to avoid, reduce or minimize possibility of non-curing or insufficient curing of the sealing material 400.

The diffraction of light occurs when the light passes through an obstacle such as a lattice. The diffraction of light is influenced by the interval between lattices. That is, the diffraction phenomenon frequently occurs as the interval between the lattices is narrow when the wavelength of light is constant.

In this embodiment, the conductive lines 230 overlapped with the sealing material may perform the function of an obstacle such as a lattice, and accordingly, the light passing between the conductive lines 230 can also be irradiated onto lower portions of the conductive lines 230 by the refraction phenomenon.

However, in embodiments, additional structure such as the optical layers may be added. It is because, in a case where only the diffraction phenomenon as discussed in the immediately above paragraph is used, even a laser beam having an intensity to an extent capable of sufficiently curing the sealing material 400 might not be sufficiently irradiated to the area overlapping the conductive lines 230. Particularly, in case of laser irradiating UV light, the wavelength of light is short, and therefore, the effect caused by the diffraction phenomenon may be insufficient.

Accordingly, in embodiments, the optical layers 600 are formed, each of which is positioned between the two immediately neighboring conductive lines 230 to allow the laser beam to be refracted toward the area overlapping the conductive lines 230, thereby improving the fusing characteristic of the sealing material.

In embodiments, the optical layers 600 are made of a material having high refractive index while allowing light to be transmitted therethrough. For example, ITO is a transparent conductive material having a refractive index of about 2. Thus, the ITO is a material applicable to the optical layers 600.

The shapes and positions of the optical layers 600 will be described in detail with reference to FIGS. 3 and 4.

First, FIG. 3 is a sectional view showing one area (I-I') of the display device integrated with the touch screen panel according to an embodiment of the present invention.

FIG. 3 is a sectional view showing one area (I-I') of the display device integrated with the touch screen panel shown in FIG. 1. The one area (I-I') shows the non-display area 510 and a portion of the display area 500.

Referring to FIG. 3, the sensing cell pattern 220 formed in the display area 500 includes first sensing cells 220a, first connecting lines 220a1, second sensing cells 220b, and second connecting lines 220b1 formed as discussed above. An insulating layer 240 is interposed between the first and second connecting lines 220a1 and 220b1.

Although it has been illustrated in FIG. 3 that the thicknesses of components such as the sensing cell pattern 220 are exaggerated, this is provided for convenience of illustration, and the actual thickness of each component is considerably thinner than that shown in FIG. 3.

Conductive lines 230 electrically connected to the sensing cell pattern 220 are formed in the non-display area 510 positioned at the outside of the display area 500.

A sealing material 400 for bonding the upper substrate 200 to the lower substrate 100 is formed on a lower surface of the non-display area 510 of the upper substrate 200.

In embodiments, the non-display area of the lower substrate 100 includes a driving circuit area, and the display area of the lower substrate 100 includes a pixel area.

That is, a plurality of pixels each having an organic light emitting diode, a thin film transistor and the like are formed in the pixel area of the lower substrate 100, and a driving circuit connected to the pixels to provide a predetermined signal and signal lines are formed in the driving circuit area of the lower substrate 100.

In this embodiment, as the dead space is minimized as described above, the sealing material 400 is formed to overlap with the driving circuit area.

That is, as shown in FIG. 3, the upper portion of the sealing material 400 is overlapped with the conductive lines 230, and the lower portion of the sealing material 400 is overlapped with the driving circuit area.

In this case, laser is irradiated onto the upper surface of the upper substrate 200 in order to cure the sealing material 400. As the conductive lines 230 are formed of an opaque low-resistance metallic material, laser cannot be transmitted through the conductive lines 230, and therefore, the sealing material 400 may not be cured in the overlapped area.

Accordingly, in this embodiment, an optical layer 600, as shown in FIG. 3, is formed in the area between the two conductive lines 230 overlapped with the sealing material 400.

The optical layer 600 allows light to be also irradiated onto the area of the sealing material overlapped with the conductive lines 230, using optical characteristics of light, i.e., diffraction and refraction characteristics of light.

To this end, in the embodiment shown in FIG. 3, a surface of the upper substrate positioned between the conductive lines 230 is patterned in a predetermined shape, and the optical layer 600 is formed in the patterned or recessed area.

In embodiments, the section of the patterned area is preferably formed in the shape of an inverse triangle, like that of a prism pattern. Accordingly, the optical layer 600 formed in the area can be formed in the shape of a prism pattern. However, the optical layer 600 according to an embodiment is not necessarily limited to the prism pattern.

In a case where the optical layer 600 is formed in the shape of the prism pattern, a laser beam incident onto the optical layer 600 is refracted leftward and rightward. Thus, the laser beam can also be irradiated onto the sealing material 400 overlapped with the conductive lines 230 adjacent to the optical layer 600.

The optical layer 600 is preferably made of a material having high refractive index while allowing light to be transmitted therethrough. For example, ITO is a transparent conductive material having a refractive index of 2. Thus, the ITO is a material applicable to the optical layer 600.

However, the optical layer 600 according to this embodiment is not limited to the ITO, and may be made of a material having high refractive index and thickness with which light can be transmitted therethrough.

In embodiments, the optical layer 600 is formed in a level between the sealing material 400 and the conductive lines 230 overlapped therewith, so that laser can be irradiated onto the entire sealing material 400. Thus, the entire width of the conductive lines 230 is sufficiently ensured while avoiding, reducing or minimizing non-curing or insufficient curing of the sealing material 400 in the bonding between the upper and lower substrate. Accordingly, it is possible to avoid, reduce or minimize the lowering of the exfoliation force between the substrates, caused by non-curing or insufficient curing of the sealing material 400, and the resistance increase of the conductive lines and short circuit between the conductive lines due to the reduction of a dead space.

In embodiments, a polarizing film 30 may be further provided on the upper surface of the touch screen panel in order to avoid, reduce or minimize visualization and reflection of the sensing cell pattern 220, caused as the touch screen panel is formed on the upper substrate 200 of the display device.

That is, in this embodiment, the touch screen panel is positioned between the display device and the polarizing film 30, so that it is possible to prevent, reduce or minimize the visualization of the sensing cell pattern and to reduce or minimize reflexibility.

In a case where the display device is implemented with an organic light emitting display having flexibility, the polarizing film 30 is also implemented to have flexibility.

To this end, the polarizing film 30 according to this embodiment is preferably implemented into a laminated structure of a polarizer, a transparent adhesive layer and a retardation compensation layer by removing a support layer made of tricacetyl cellulose (TAC), which is included in the existing polarizing plate. Accordingly, the polarizing film 30 can obtain flexibility, i.e., high bendability.

The existing polarizing plate is generally implemented into a structure in which a polarizer is interposed between upper and lower support layers.

The polarizer performs a function of controlling the amount of light transmitted according to the degree of polarization of light incident thereonto. The polarizer may include poly vinyl alcohol (PVA). For example, the polarizer implements polarization by stretching the PVA film, which absorbs iodine, with strong tension.

In embodiments, the support layers or films made of TAC may be provided on both surfaces of the polarizer to protect and support the PVA film.

The polarizing plate is generally attached to the outside of a display panel in order to improve external visibility such as the prevention, reduction or minimization of external light reflection. In a case where a touch screen panel is attached on the display panel, the polarizing plate may be attached to an outer face of the touch screen panel.

However, the polarizing plate and the touch screen panel pass through a process of individually manufacturing the polarizing plate and the touch screen panel and then attaching or assembling them to each other. In this case, it is possible that there is decrease in process efficiency and decrease in yield.

Particularly, in the polarizing plate with the laminated structure, the polarizer has a thickness of about 20 μm, and each of the upper and lower support layers has a thickness of about 80 μm. Hence, the polarizing plate is implemented to have a thickness of about 180 μm. In a case where the polarizing plate is attached to the touch screen panel as it is, the entire thickness of the touch screen panel is increased, which goes against the tendency to decrease the thickness of the touch screen panel.

The TAC that is a material of the support layer has high elasticity. Therefore, if the polarizing plate provided with the support layer is attached to a flexible touch screen panel, it is impossible to ensure the bendability of the flexible touch screen panel.

Accordingly, in this embodiment, the polarizing film 30 can have flexibility by removing the support layer provided in the existing polarizing film, and supporting and protecting the polarizer with a transparent adhesive layer.

In order to improve the strength of the display device, a window substrate 40 is additionally provided on an upper surface of the polarizing film 30.

As shown in FIG. 3, a black matrix layer (decoration layer) 42 is formed in the area of the window substrate 40, overlapped with the non-display area 510. Accordingly, the black matrix layer (decoration layer) 42 performs a function of forming a frame of the display area while preventing, reducing or minimizing the visualization of the pattern such as the sensing line 230 formed in the non-display area 510.

In a case where the display device and the touch screen panel have flexibility as described above, the window substrate 40 is preferably made of a material having flexibility.

Therefore, in this embodiment, the window substrate 40 may be made of a material such as polymethyl methacrylate (PMMA), acryl or polyester. The window substrate 40 may be formed to have a thickness of about 0.7 mm.

The polarizing film 30 and the window substrate 40, which are attached on a first surface of the upper substrate 100 on which the sensing cell pattern and the like are formed, may be implemented by a first transparent adhesive layer 25 interposed between the upper substrate 100 and the polarizing film 30 and a second transparent adhesive layer 27 interposed between the polarizing film and the window substrate 40. The first and second transparent adhesive layers 25 and 27 may be made of a transparent adhesive material having high light transmittance, such as super view resin or optical cleared adhesive (OCA).

FIG. 4 is a sectional view showing one area (I-I') of a display device integrated with a touch screen panel according to another embodiment of the present invention.

Here, the embodiment shown in FIG. 4 is different from that shown in FIG. 3 in that an optical layer 600' is not formed in the patterned area of the upper substrate 200 but formed in the patterned area of an insulating layer 50 formed on the conductive lines 230. Components except the optical layer 600' are identical to those of the embodiment shown in FIG. 3.

Therefore, the components identical to those of the embodiment shown in FIG. 3 are designated by like reference numerals, and their detailed descriptions will be omitted.

Referring to FIG. 4, in this embodiment, an insulating layer 50 is formed on the upper substrate 200 including the conductive lines 230, and the first transparent adhesive layer 25 is formed on the insulating layer 50.

In this case, one surface of the insulating layer 50 positioned between the conductive lines 230 is patterned in a predetermined shape, and an optical layer 600' is formed in the patterned or recessed area.

In embodiments, the section of the patterned area may be formed in a shape of an inverse triangle, like that of a prism pattern. Accordingly, the optical layer 600' formed in the area can be formed in the shape of a prism pattern. However, the optical layer 600' according to an embodiment is not necessarily limited to the prism pattern.

In a case where the optical layer 600' is formed in the shape of the prism pattern, a laser beam incident onto the optical layer 600 is refracted leftward and rightward. Thus, the laser beam can also be irradiated onto the sealing material 400 overlapped with the conductive lines 230 adjacent to the optical layer 600'.

The optical layer 600' is preferably made of a material having high refractive index while allowing light to be transmitted therethrough. For example, ITO is a transparent conductive material having a refractive index of 2. Thus, the ITO is a material applicable to the optical layer 600'.

However, the optical layer 600' according to this embodiment is not limited to the ITO, and may be made of a material having high refractive index and thickness with which light can be transmitted therethrough.

By way of summation and review, in embodiments, a touch screen panel is separately manufactured and then attached to an outer face of a display device such as a liquid crystal display device, an organic light emitting display device, and the like. In a case where the separately manufactured touch screen panel is used by being attached to the display device, the entire thickness of a product is increased, and the manufacturing cost of the product is increased.

Recently, a display area in which an image is displayed has been maximized. Corresponding to this, a non-display area, i.e., a dead space positioned at the outside of the display area has been minimized.

Accordingly, in order to form conductive lines of the touch screen panel in the narrow non-display area, the width of the conductive lines and the interval between the conductive lines are decreased, which may cause increase in resistance of the conductive lines and short circuit between the conductive lines.

In the display device integrated with the touch screen panel directly formed on the upper substrate of the display device according to the embodiments of the present invention, the conductive lines arranged in the non-display area of the touch screen panel are overlapped with the sealing material for sealing the upper and lower substrates of the display device, and the optical layer is formed in the area between the conductive lines, so that it is possible to avoid, reduce or minimize the lowering of the exfoliation force between the substrates, caused by non-curing or insufficient curing of the sealing material, and increase in the resistance of the conductive lines and short circuit between the conductive lines due to the reduction of a dead space.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device integrated with a touch screen panel, comprising:
    upper and lower substrates, the upper substrate comprising a major surface;
    a display area and a non-display area next to the display area when viewed in a viewing direction perpendicular to the major surface;
    a sensing cell structure comprising a plurality of sensing cells and formed over the upper substrate and in the display area when viewed in the viewing direction;
    a plurality of conductive lines formed over the upper substrate and in the non-display area when viewed in the viewing direction, the plurality of conductive lines comprising a first conductive line and a second conductive line that are connected to different sensing cells of the sensing cell structure;
    a sealing material formed between the upper and lower substrates and in the non-display area when viewed in the viewing direction;
    the first and second conductive lines being at the same level over the sealing material in a cross-section taken along a plane parallel to the viewing direction, the first and second conductive lines extending parallel to each other and immediately neighboring with each other when viewed in the viewing direction; and
    an optical layer overlapping with the sealing material and extending between the first and second conductive lines when viewed in the viewing direction.

2. The display device of claim 1, wherein the optical layer is formed of a material having a refractive index of about 2 or more while allowing light to be transmitted therethrough.

3. The display device of claim 2, wherein the optical layer is formed of indium tin oxide (ITO).

4. The display device of claim 1, wherein the upper substrate comprising a recessed area formed on a surface thereof and positioned between the first and second conductive lines when viewed in the viewing direction, wherein the optical layer is formed in the recessed area.

5. The display device of claim 4, wherein the recessed area of the upper substrate has a section formed in the shape of an inverse triangle.

6. A display device integrated with a touch screen panel, comprising:
    upper and lower substrates, the upper substrate comprising a major surface;
    a display area and a non-display area next to the display area when viewed in a viewing direction perpendicular to the major surface;
    a sensing cell structure comprising a plurality of sensing cells and formed over the upper substrate and in the display area when viewed in the viewing direction;
    a plurality of conductive lines formed over the upper substrate and in the non-display area when viewed in the viewing direction, the plurality of conductive lines being connected to the sensing cell structure;
    a sealing material formed between the upper and lower substrates and in the non-display area when viewed in the viewing direction;
    the plurality of conductive lines overlapping with the sealing material when viewed in the viewing direction;
    an optical layer formed between two immediately neighboring conductive lines among the plurality of conductive lines when viewed in the viewing direction; and
    an insulation layer formed over the upper substrate and the conductive lines, and
    wherein the insulation layer comprises a recessed area formed on a surface thereof and positioned between the two immediately neighboring conductive lines when viewed in the viewing direction, wherein the optical layer is formed in the recessed area.

7. The display device of claim 6, wherein the recessed area of the upper substrate has a section formed in the shape of an inverse triangle.

8. The display device of claim 1, further comprising a driving circuit area formed in the non-display area when viewed in the viewing direction.

9. The display device of claim 1, wherein the sensing cell structure comprises:
    the plurality of sensing cells comprising:
    first sensing cells arranged along row lines extending along a first direction; and
    second sensing cells arranged along column lines extending along a second direction,
    first connecting lines, each of which is formed to connect two cells among the first sensing cells arranged along the first direction; and
    second connecting lines, each of which is formed to connect two cells among the second sensing cells arranged along the second direction.

10. The display device of claim 9, wherein the plurality of sensing cells are formed in the same layer.

11. The display device of claim 10, wherein the second sensing cells are integrally formed with the second connecting lines.

12. The display device of claim 10, further comprising an insulation layer interposed between one of the first connecting lines and one of the second connecting lines which overlap each other when viewed in the viewing direction.

13. The display device of claim 9, wherein the plurality of sensing cells are formed on an outer surface of the upper substrate.

14. The display device of claim 1, wherein the upper substrate is a sealing substrate of an organic light emitting display device.

15. The display device of claim 1, further comprising:
    a polarizing film placed over the upper substrate over which the sensing cell structure and the plurality of conductive lines are formed; and
    a window substrate placed over the polarizing film.

16. The display device of claim 15, wherein a black matrix layer is formed over the window substrate and in the non-display area when viewed in the viewing direction.

17. A display device integrated with a touch screen panel, comprising:
    upper and lower substrates, the upper substrate comprising a major surface;

a display area and a non-display area next to the display area when viewed in a viewing direction perpendicular to the major surface;

a sensing cell structure comprising a plurality of sensing cells and formed over the upper substrate and in the display area when viewed in the viewing direction;

a plurality of conductive lines formed over the upper substrate and in the non-display area when viewed in the viewing direction, the plurality of conductive lines being connected to the sensing cell structure;

a sealing material formed between the upper and lower substrates and in the non-display area when viewed in the viewing direction;

the plurality of conductive lines overlapping, with the sealing, material when viewed in the viewing direction;

an optical layer formed between two immediately neighboring conductive lines among the plurality of conductive lines when viewed in the viewing direction;

a polarizing file laced over the upper substrate over which the sensing cell structure and the conductive lines are formed; and a window substrate placed over the polarizing film, wherein the polarizing film is flexible and comprises a polarizer, a retardation compensation layer, and a transparent adhesive for supporting the polarizer and attaching the retardation compensation layer to the polarizer.

18. The display device of claim 15, wherein the window substrate is flexible and formed of at least one selected from the group consisting of polymethyl methacrylate (PMMA), acryl and polyester.

\* \* \* \* \*